US008080774B1

(12) United States Patent
Guinn et al.

(10) Patent No.: US 8,080,774 B1
(45) Date of Patent: Dec. 20, 2011

(54) MODULE FOR SCALABLE MILLIMETER WAVE IMAGING ARRAYS

(75) Inventors: Keith V. Guinn, Thousand Oaks, CA (US); James H. Schaffner, Chatsworth, CA (US); Jonathan Lynch, Oxnard, CA (US)

(73) Assignee: HRL Laboratories, LLC, Malibu, CA (US)

( * ) Notice: Subject to any disclaimer, the term of this patent is extended or adjusted under 35 U.S.C. 154(b) by 656 days.

(21) Appl. No.: 12/190,453

(22) Filed: Aug. 12, 2008

(51) Int. Cl.
*H01L 27/00* (2006.01)
*G01S 13/89* (2006.01)

(52) U.S. Cl. .................... 250/208.1; 250/332; 250/336.1

(58) Field of Classification Search ............... 250/208.1, 250/332, 336.1; 324/95, 120, 637
See application file for complete search history.

(56) References Cited

U.S. PATENT DOCUMENTS

| | | | | |
|---|---|---|---|---|
| 3,824,593 A * | 7/1974 | Baird | ........................... | 342/179 |
| 3,882,396 A * | 5/1975 | Schneider | ...................... | 455/325 |
| 5,237,334 A * | 8/1993 | Waters | .......................... | 343/753 |
| 5,760,397 A * | 6/1998 | Huguenin et al. | ............ | 250/332 |
| 6,049,313 A * | 4/2000 | Sawada et al. | ................ | 343/786 |
| 6,635,907 B1 * | 10/2003 | Nguyen et al. | ................ | 257/183 |
| 6,828,556 B2 * | 12/2004 | Pobanz et al. | ............. | 250/336.1 |
| 6,841,768 B2 * | 1/2005 | Moon et al. | ................ | 250/208.1 |
| 7,064,726 B2 * | 6/2006 | Kitamori et al. | .............. | 343/771 |
| 7,081,370 B2 * | 7/2006 | Kumagai et al. | ................ | 438/69 |
| 7,135,848 B1 | 11/2006 | Ammar | | |
| 7,245,264 B2 * | 7/2007 | Sakakibara et al. | .......... | 343/772 |
| 7,583,074 B1 * | 9/2009 | Lynch et al. | ................... | 324/120 |
| 7,795,859 B1 * | 9/2010 | Lynch et al. | ................... | 324/120 |
| 2002/0080081 A1 * | 6/2002 | Liu | ................................ | 343/786 |
| 2002/0149530 A1 * | 10/2002 | Ballantine et al. | ............ | 343/772 |
| 2003/0210197 A1 * | 11/2003 | Cencich et al. | ............... | 343/786 |
| 2005/0009226 A1 * | 1/2005 | Kumagai et al. | ................ | 438/69 |
| 2005/0270247 A1 * | 12/2005 | Kitamori et al. | .............. | 343/754 |
| 2006/0220952 A1 * | 10/2006 | Aoki | ............................. | 342/175 |
| 2006/0220974 A1 * | 10/2006 | Sakakibara et al. | .......... | 343/772 |
| 2008/0048922 A1 * | 2/2008 | Haziza | .......................... | 343/772 |
| 2009/0066598 A1 * | 3/2009 | Malstrom et al. | ............. | 343/786 |

OTHER PUBLICATIONS

Kane, B., et al., "High Sensitivity W-Band MMIC Radiometer Modules," IEEE 1995 Microwave and Millimeter-Wave Monolithic Circuits Symposium, pp. 59-62 (1995).

Yngvesson, K.S., et al., "The Tapered Slot Antenna-A New Integrated Element for Millimeter-Wave Applications," IEEE Transactions on Microwave theory and Techniques, vol. 37, No. 2, (Feb. 1989).

* cited by examiner

*Primary Examiner* — John Lee

(74) *Attorney, Agent, or Firm* — Ladas & Parry

(57) ABSTRACT

A millimeter wave module for providing one pixel having a pixel resolution in a millimeter wave focal plane array includes a horn antenna having a first cross section area less than or equal to the pixel resolution, a detector for detecting the millimeter wave signals received by the horn antenna, the detector mounted in a recess in the horn antenna and having a second cross section area less than or equal to the first cross section area, and a video output adapter connected to the horn antenna and electrically connected to the detector for providing a connection from the detector, the video output adapter having a third cross section area less than or equal to the first cross section area.

37 Claims, 6 Drawing Sheets

MODULE FOR SCALABLE MILLIMETER WAVE IMAGING ARRAYS

STATEMENT REGARDING FEDERALLY SPONSORED RESEARCH OR DEVELOPMENT

The present invention was made with support from the United States Government under contract W911QX-04-C-0127 awarded by the DARPA. The United States Government has certain rights in the invention.

TECHNICAL FIELD

This disclosure relates to millimeter wave imaging arrays and in particular to a modular and scalable millimeter wave imaging array.

BACKGROUND

In the past, very few millimeter wave imaging cameras have been produced and millimeter wave detectors were typically machined as individual units and then hand assembled. The need for millimeter wave imaging arrays has increased, because of the need to detect concealed weapons and contraband hidden under clothing. Yngvesson, K. S.; Korzeniowski, T. L.; Kim, Y.-S.; Kollberg, E. L.; Johansson, J. F., "The tapered slot antenna-a new integrated element for millimeter-wave applications," IEEE Trans. Microwave Theory Techniques,", Vol. 37, No. 2, February 1989, pp. 365-374 describes a tapered slot antenna for millimeter wave applications. B. Kane, S. Weinreb, E. Fisher, and N. Byer, "High Sensitivity W-Band MMIC Radiometer Modules," IEEE 1995 Microwave and Millimeter-Wave Monolithic Circuits Symposium Digest, 1995, pp. 59-62 describes a W-band module. Each of these references describes antennas or millimeter wave modules that are not modular. The designs in both these papers are not scalable to large arrays and are also not suitable for volume manufacturing.

U.S. Pat. No. 7,135,848 to D. F. Ammar describes a radiometer sensor cell for a scanning millimeter wave scanning imaging camera. The cell of Ammar is only suitable for building scalable imaging arrays having dimensions of 2×M, where M may be an arbitrary integer number. The cell of Ammar is quite large, so pixel resolution is low and the Ammar design is also not suitable for volume manufacturing.

What is needed is a modular scalable imaging array, which allows an arbitrarily large N×M array to be built. There is a need for a low-cost module design so that commercial quantities of imaging arrays can be produced in order to lower the cost of millimeter wave imaging cameras. The embodiments of the present disclosure answer these and other needs.

SUMMARY

In a first embodiment disclosed herein, a millimeter wave module for providing one pixel having a pixel resolution in a millimeter wave focal plane array includes a horn antenna for receiving millimeter wave signals and having a first cross section area less than or equal to the pixel resolution, a detector for detecting the millimeter wave signals received by the horn antenna, the detector mounted in a recess in the horn antenna and having a second cross section area less than or equal to the first cross section area, and a video output adapter connected to the horn antenna and electrically connected to the detector for providing a connection from the detector, the video output adapter having a third cross section area less than or equal to the first cross section area.

In another embodiment disclosed herein, a scalable millimeter wave focal plane array for providing a plurality of pixels each having a pixel resolution includes a frame, a plurality of millimeter wave modules, each for providing one pixel having the pixel resolution and each held within said frame, wherein each module comprises a horn antenna for receiving millimeter wave signals and having a first cross section area less than or equal to the pixel resolution, a detector for detecting the millimeter wave signals received by the horn antenna, the detector mounted in a recess in the horn antenna and having a second cross section area less than or equal to the first cross section area, and a video output adapter connected to the horn antenna and electrically connected to the detector for providing a connection from the detector, the video output adapter having a third cross section area less than or equal to the first cross section area.

These and other features and advantages will become further apparent from the detailed description and accompanying figures that follow. In the figures and description, numerals indicate the various features, like numerals referring to like features throughout both the drawings and the description.

DETAILED DESCRIPTION

Figure 1B:
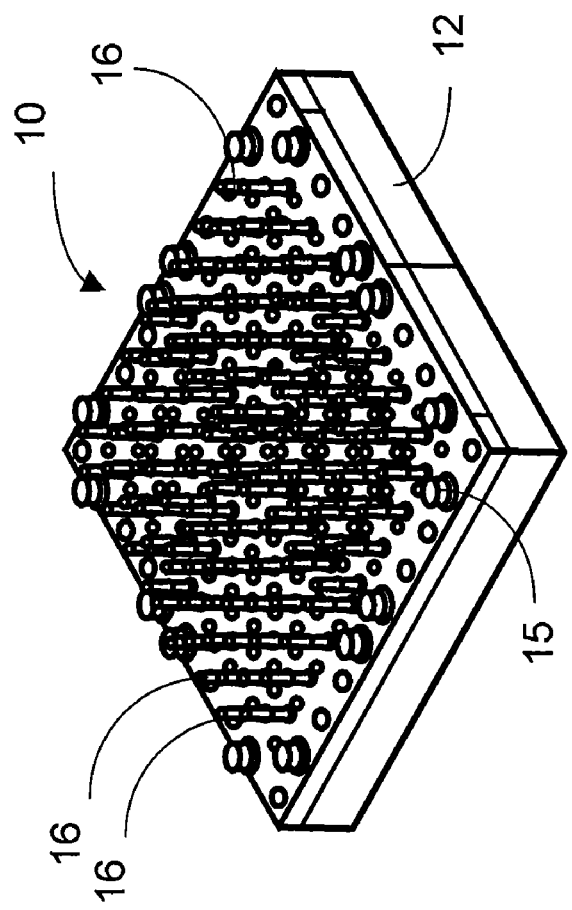
FIG. 1B is another perspective view of the imaging array of FIG. 1A in accordance with the present disclosure.
Figure 1A:
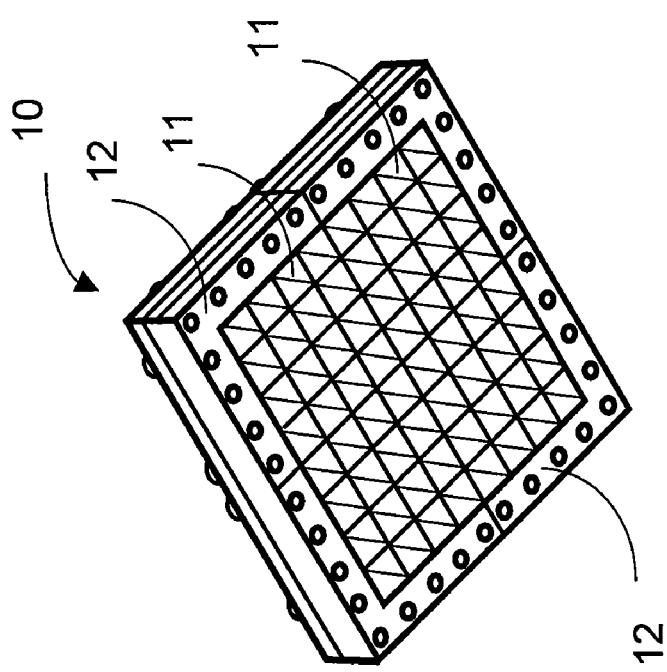
FIG. 1A is a perspective view of an imaging array in accordance with the present disclosure.

Referring to FIG. 1A, the millimeter wave receiving side of an imaging focal plane array 10, in accordance with the present disclosure, is shown. FIG. 1B shows the output side of the focal plane array. Millimeter wave modules 11, which form the imaging focal plane array, are held in a frame 12 fastened together by screws 15. Each millimeter wave module 11 is configured to provide one pixel of the imaging focal plane array and each module includes a horn antenna 14 to collect millimeter wave signals, a detector to detect the video signal in the millimeter wave signals, and a video output adapter, which provides for connecting the detected video signal to a post processor (not shown). In FIG. 1B the video output adapters 16 are shown as cable connectors; however, there are other embodiments of video output adapters as further described below. The detector is located within the millimeter wave module between the input to the horn antenna and the video output adapters, as described further below.

For operation at millimeter wave frequencies, or between 70 and 150 GHz, the overall size of the exemplary 8×8 imaging array shown in FIGS. 1A and 1B can be approximately 4.8 cm×4.8 cm, not including the frame 12. The individual millimeter wave modules 11 may have a horn antenna cross section area that is about 6 mm×6 mm, which corresponds to two wavelengths at about 100 GHz. This dimension provides acceptable pixel resolution for millimeter wave imaging. Smaller size modules with smaller horn antenna cross section areas are also possible. Although FIGS. 1A and 1B show an 8×8 array, much larger arrays, such as 1024×1024 arrays are possible.

Figure 2B:
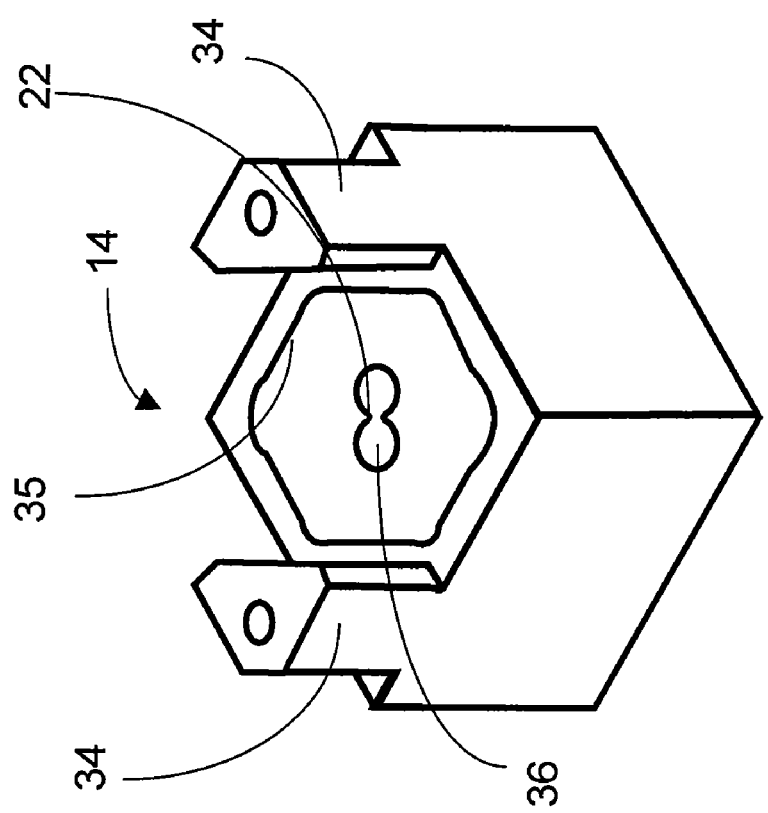
FIG. 2B is another perspective view of the horn antenna of FIG. 2A in accordance with the present disclosure.
Figure 2A:
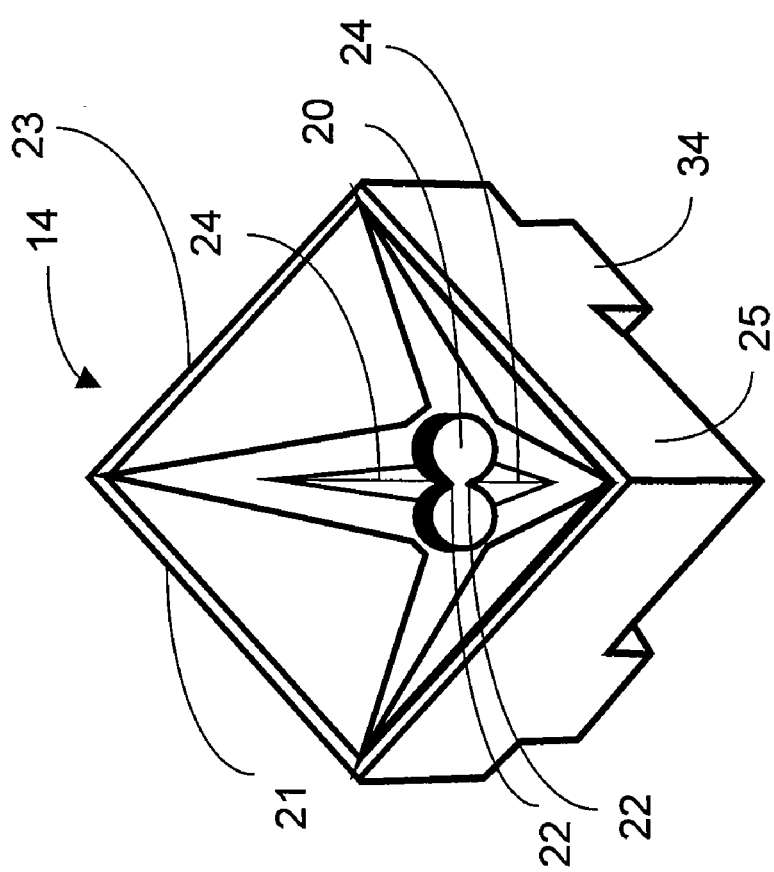
FIG. 2A is a perspective view of a horn antenna for an imaging array in accordance with the present disclosure.

FIGS. 2A and 2B show a detailed perspective view of the front and back of an exemplary horn antenna 14, respectively. The horn antenna can be made using low-cost manufacturing techniques such as electro-deposition or metal injection molding.

The input cross-section area of the horn antenna is the dimension of side 21 times the dimension of side 23. As described above, in one embodiment sides 21 and 23 may each be 6 millimeters. Sides 21 and 23 can also be less than 6 millimeters. As shown in FIG. 2A the sides of the horn antenna, such as side 25, are configured so that the cross section area of the horn antenna at any section taken along the side, never exceeds the cross section area defined by sides 21 and 23. The cross section area of millimeter wave module 11, which as described above includes the horn antenna, a detector, and a video output adapter, also never exceeds the cross section area defined by sides 21 and 23. This ensures that the millimeter wave module 11 can be used to build any size focal plane array 10.

In FIG. 2A the horn antenna 14 is shown to have ridged waveguide transitions 24, which are raised portions that provide for wider bandwidth operation. A millimeter wave signal received by the horn antenna is focused by the horn antenna into opening 20. The opening 20, shown in FIG. 2A, is generally circular; however, it is also ridged as shown by ridges 22, which are located on either side of the opening near the center of opening 20 and are aligned with the ridged waveguide transitions 24, which connect to the ridges 22. The ridges 22 together with the ridged waveguide transitions 24 enhance the wideband operation of the module.

FIG. 2B shows the rear side of an exemplary horn antenna 14. A recess 35 is located on the rear side of the horn antenna and the recess is configured so that a detector substrate piece 40, shown in FIG. 3A, can be inserted into the recess 35. The recess 35 ensures that the detector substrate piece, which includes a detector 60, is properly aligned relative to the signal input from the opening 20. The tabs 34 on the horn antenna are configured to mate to a video output piece described below.

Figure 2C:
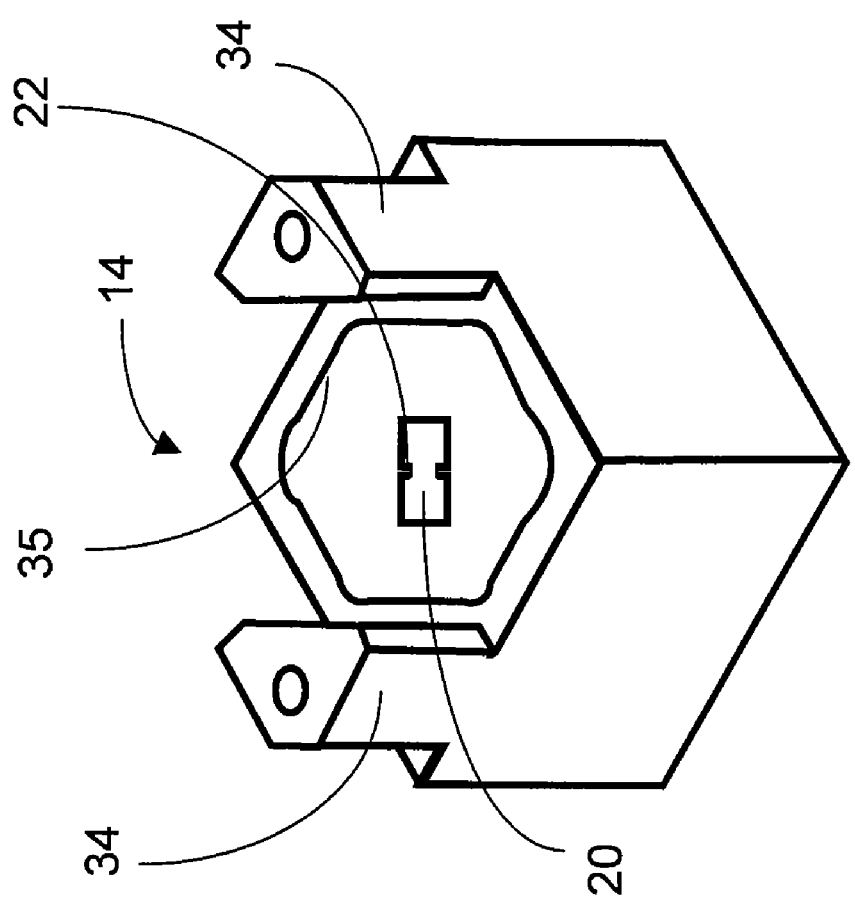
FIG. 2C is another perspective view of a horn antenna in accordance with the present disclosure.

FIG. 2C shows another embodiment of the horn antenna 14 with an essentially rectangular opening 36 rather than essentially circular opening 20 shown in FIG. 2B. The opening 20 of FIG. 2C also has ridges 22 to provide for wider bandwidth operation.

Figure 3B:
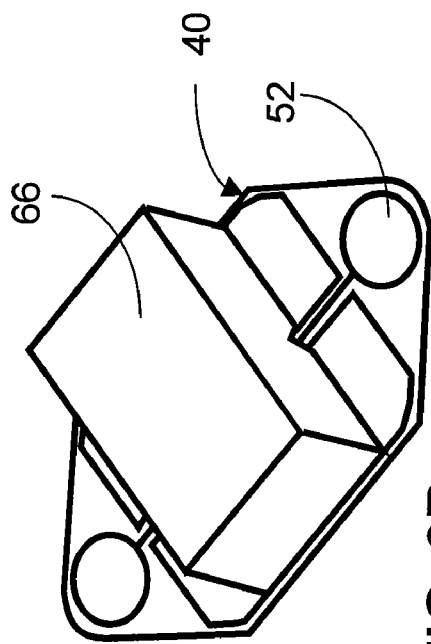
FIG. 3B is a perspective view of a back short on top of the substrate in accordance with the present disclosure.
Figure 3C:
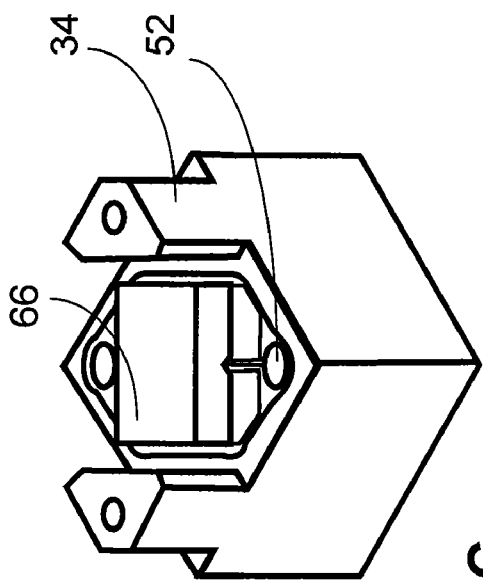
FIG. 3C is a perspective view of a back short on top of the substrate mounted in the horn antenna in accordance with the present disclosure.
Figure 3A:
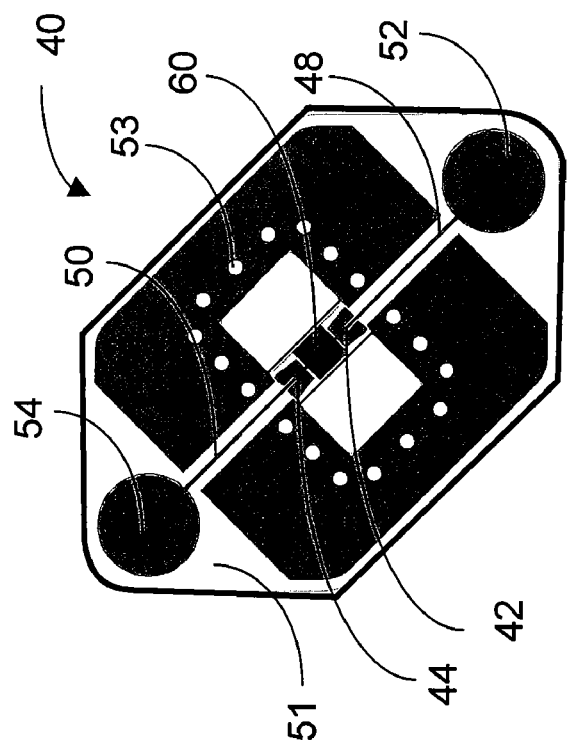
FIG. 3A shows a substrate with circuit components in accordance with the present disclosure.

The detector substrate piece 40, shown in FIG. 3A includes a substrate 51 that contains thin-film printed circuit probes 42 and 44 that receive the signal from the horn antenna 14 opening 20. The circuit probes 42 and 44 provide the signal to a diode 60, which can be flip-chip mounted onto the substrate 51 or can be wire-bonded to the substrate 51. The diode detects a video signal and, as shown, video output lines 48 and 50 on the substrate 51 carry the video output from the diode 60 to two video output contact pads 52 and 54 to provide a differential video signal output. Some applications can also have a single video output rather than differential.

In one embodiment the diode 60 can be a Sb-heterostructure diode, which allows for unamplified detection of millimeter wave frequencies from 70 GHz to 150 GHz. This reduces the volume otherwise required by a monolithic microwave integrated circuit (MMIC) low-noise preamplifier. The cost of a low-noise preamplifier is also saved. Other diodes that require amplification may also be used.

The substrate 51 is laser machined to a shape that matches the shape of recess 35 on the rear of the horn antenna 14. The dimensions of recess 35 and substrate 51 are well within the cross section of the horn antenna. Thus the substrate that contains the detector has a cross section area that is less than or equal to the cross section area of the horn antenna.

The substrate 51 can typically be alumina, quartz, or other millimeter wave substrate materials of the appropriate thickness. The thin-film printed circuit on the substrate 51 is fabricated using commercially available techniques. Plated holes 53 provide electrical interconnects between the top and the bottom of the substrate 51.

FIG. 3B shows a back short 66 placed over the detector substrate piece 40, and FIG. 3C shows this combination mounted in the recess 35. The back short 66 is put on top of the detector substrate piece 40 to provide an impedance match and termination for the signal from the horn antenna 14. The back short 66 can be fabricated as a separate piece of metal and then is attached to the detector substrate piece 40 on plated holes 53, which provide alignment for the back short 66, as well as the electrical interconnect discussed above between the top and the bottom of the substrate 51. The detector substrate piece 40 with the back short piece 66 is then attached into the recess 35 using either solder or conductive epoxy, as shown in FIG. 3C. This assembly process can be performed using automated pick-and-place machines.

Figure 4:
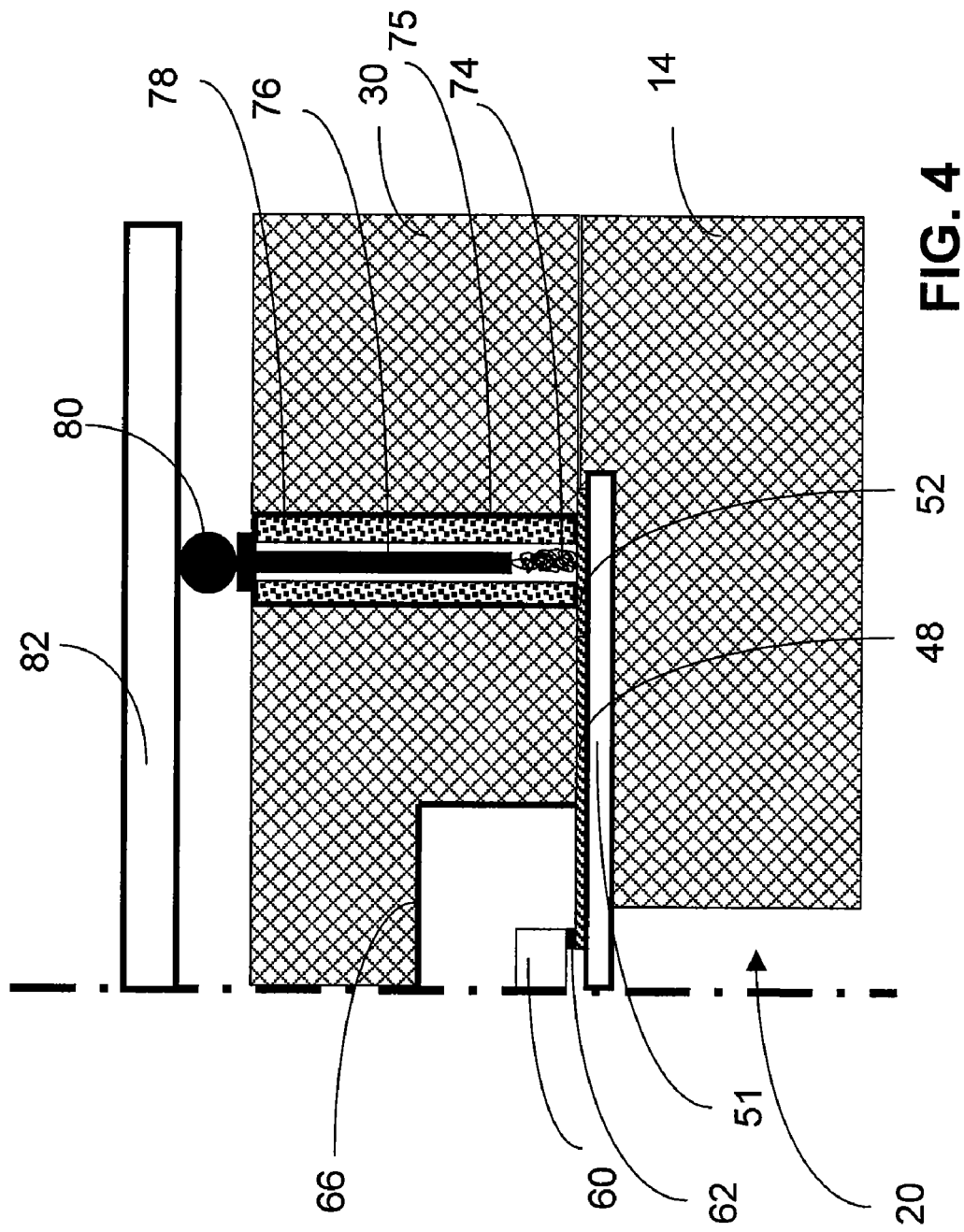
FIG. 4 is a sectional view showing the coupling of the video output using a ball-grid array in accordance with the present disclosure.

FIG. 4 shows one embodiment for a video output adapter and is a half of a cross section along the video output line 48 on the substrate 51 that leads to the video output contact pad 52. In this embodiment a video output piece 30 is configured to mate with the horn antenna 14 and is placed over the rear of the horn antenna 14. The cross section area of the video output piece 30 is less than or equal to the cross section area of the horn antenna.

A hole 75 is fabricated in the video support piece 30 and is centered on the center of video output contact pad 52. Teflon or another non-conducting material is formed into a sleeve 78 that is inserted into the hole 75 and then a conductive pin 76, which can be metal, is placed in the sleeve. The pin can slide in the sleeve and the sleeve 78 insulates the pin 76 from the video output piece 30. Gentle contact is made between the pin 76 and the video output contact pad 52 by tiny commercially available springs 74, such as fuzz-buttons. These springs 74 keep constant pressure on between the video output contact pad 52 and the pin 76 to insure a good electrical contact.

As shown in FIG. 4, the other end of the pin is in contact with a ball 80 of a ball grid array on board 82. The board 82 contains a ball for each millimeter wave module 11 in the array and printed circuits to route the signals from each ball 80 to a post processor (not shown).

Also shown in FIG. 4 is the connection of the diode 60 to the video output line 48 via flip-chip connection 62. The opening 20 guides the signal to the circuit probes 42 and (not shown) and the signal is terminated by back short 66 to provide an impedance match.

Figure 5:
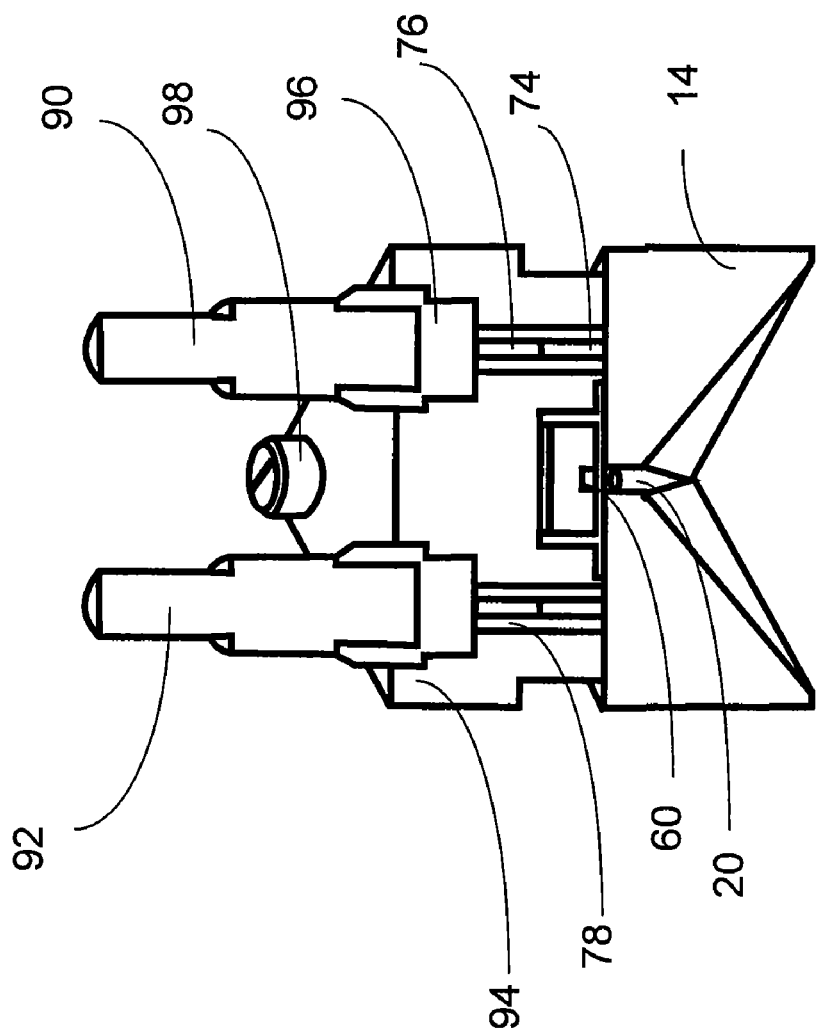
FIG. 5 is a perspective sectional view of a module for an imaging array with cable connectors in accordance with the present disclosure.

FIG. 5 shows a perspective cross-sectional view of another embodiment of the video output adapter using cable connectors. The video output is similar to that shown in FIG. 4 in that a spring 74 is between pin 76 and video output contact pad 52. However, in FIG. 5, instead of the pin 76, insulated by sleeve 78, contacting a ball in a ball grid array, the pin 76 contacts a cable connector 90, which is installed in a shroud 96. The video cable output piece 94 can be mounted on the rear of the horn antenna 14 by screws 98. The cross section area of the video cable output piece 94 is less than or equal to the cross section area of the horn antenna.

For an embodiment with differential video outputs from the detector 60, two cable connectors 90 and 92 are provided. The cable connectors 90 and 92 can be commercially available snap-on connectors.

Figure 6:
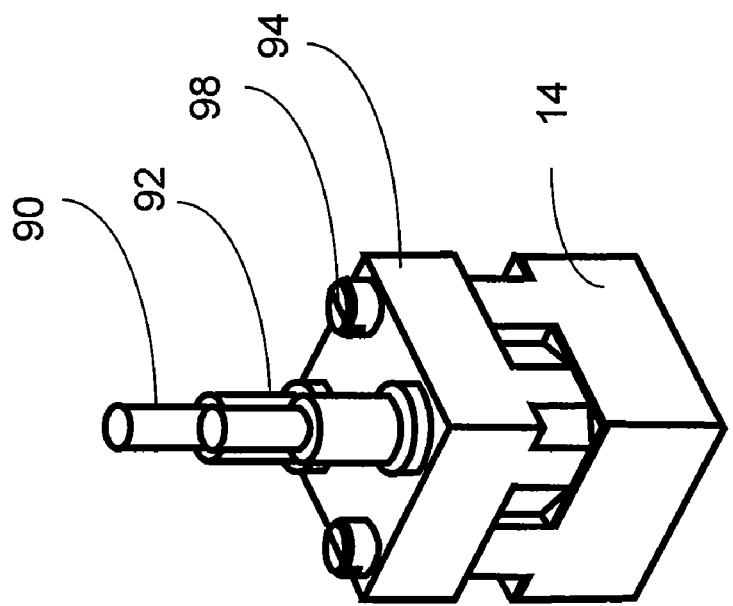
FIG. 6 is a perspective view of a module for an imaging array in accordance with the present disclosure.

FIG. 6 shows a perspective view of the assembled module using the video output adapter with cable connectors. The video output as described above can also be via a ball grid array and other connection techniques can also be employed. Since each module is entirely self-contained from millimeter wave input via the horn antenna 14 to the video output, focal plane imaging arrays can be built and scaled to any array size.

The module enables low-cost millimeter wave focal plane arrays for millimeter wave imaging cameras. Although the bandwidth of the modules as described by the embodiments above is for millimeter wave frequencies or from 70 GHz to 150 GHz, other operational frequencies can be implemented by scaling the dimensions of this module, along with making appropriate modifications to the waveguide and circuitry.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A millimeter wave module for providing one pixel having a pixel resolution in a millimeter wave focal plane array, the millimeter wave module comprising:
    a horn antenna for receiving millimeter wave signals and having a first cross section area less than or equal to the pixel resolution, the horn antenna having a recess on a rear side of the horn antenna;
    a detector substrate mounted in the recess and configured to be aligned by the recess to the horn antenna and having a second cross section area less than or equal to the first cross section area;
    a detector on the detector substrate for detecting the millimeter wave signals received by the horn antenna, the detector aligned by the detector substrate to receive the millimeter wave signals from the horn antenna; and
    a video output adapter mounted on the rear side of the horn antenna and electrically connected to the detector for providing a connection from the detector, the video output adapter having a third cross section area less than or equal to the first cross section area.

2. The module of claim 1 wherein the video output adapter comprises:
    a spring electrically coupled to the detector; and
    a pin slidably mounted in the video output adapter and in contact with the spring, the pin being electrically conductive.

3. The module of claim 1 wherein the horn antenna first cross section area is about 6 millimeters by 6 millimeters.

4. The module of claim 1 wherein the detector comprises:
    a signal probe coupled to the substrate for receiving the millimeter wave signals from the horn antenna;
    a diode coupled to the substrate and electrically coupled to the signal probe; and
    a video output coupled to the diode and to the video output adapter.

5. The module of claim 4 wherein the diode is a Sb-heterostructure diode.

6. The module of claim 1 wherein the recess in the horn antenna aligns the detector mounted in the recess for detecting the millimeter wave signals received by the horn antenna.

7. The module of claim 1 further comprising a back short coupled to the detector.

8. The module of claim 1 wherein the horn antenna comprises a ridged waveguide transition.

9. The module of claim 8 wherein the horn antenna further comprises:
    an essentially circular opening having a ridge; and
    wherein the ridge is aligned with the ridged waveguide transition.

10. The module of claim 8 wherein the horn antenna further comprises:
    an essentially rectangular opening having a ridge; and
    wherein the ridge is aligned with the ridged waveguide transition.

11. The module of claim 1 wherein the video output adapter comprises a differential video output.

12. The module of claim 2 wherein the video output adapter is configured for the slidably mounted pin to contact a ball in a ball grid array.

13. The module of claim 2 wherein the video output adapter is configured for the slidably mounted pin to contact a cable connector.

14. A scalable millimeter wave focal plane array for providing a plurality of pixels each having a pixel resolution, the millimeter wave focal plane array comprising:
a frame;
a plurality of millimeter wave modules, each for providing one pixel having the pixel resolution and each held within said frame, wherein each module comprises:
a horn antenna for receiving millimeter wave signals and having a first cross section area less than or equal to the pixel resolution, the horn antenna having a recess on a rear side of the horn antenna;
a detector substrate mounted in the recess and configured to be aligned by the recess to the horn antenna and having a second cross section area less than or equal to the first cross section area
a detector on the detector substrate for detecting the millimeter wave signals received by the horn antenna, the detector aligned by the detector substrate to receive the millimeter wave signals from the horn antenna; and
a video output adapter mounted on the rear side of the horn antenna and electrically connected to the detector for providing a connection from the detector, the video output adapter having a third cross section area less than or equal to the first cross section area.

15. The module of claim 14 wherein the video output adapter comprises:
a spring electrically coupled to the detector; and
a pin slidably mounted in the video output adapter and in contact with the spring, the pin being electrically conductive.

16. The module of claim 14 wherein the horn antenna first cross section area is about 6 millimeters by 6 millimeters.

17. The module of claim 14 wherein the detector comprises:
a signal probe coupled to the substrate for receiving the millimeter wave signals from the horn antenna;
a diode coupled to the substrate and electrically coupled to the signal probe; and
a video output coupled to the diode and to the video output adapter.

18. The module of claim 17 wherein the diode is a Sb-heterostructure diode.

19. The module of claim 14 wherein the recess in the horn antenna aligns the detector mounted in the recess for detecting the millimeter wave signals received by the horn antenna.

20. The module of claim 14 further comprising a back short coupled to the detector.

21. The module of claim 14 wherein the horn antenna comprises a ridged waveguide transition.

22. The module of claim 21 wherein the horn antenna further comprises:
an essentially circular opening having a ridge; and
wherein the ridge is aligned with the ridged waveguide transition.

23. The module of claim 21 wherein the horn antenna further comprises:
an essentially rectangular opening having a ridge; and
wherein the ridge is aligned with the ridged waveguide transition.

24. The module of claim 14 wherein the video output adapter comprises a differential video output.

25. The module of claim 15 wherein the video output adapter is configured for the slidably mounted pin to contact a ball in a ball grid array.

26. The module of claim 15 wherein the video output adapter is configured for the slidably mounted pin to contact a cable connector.

27. The scalable millimeter wave focal plane array of claim 14 wherein the plurality of millimeter wave modules comprises an M×N array of millimeter wave modules, wherein M is the number of modules in a first dimension and N is the number of modules in a second dimension.

28. The scalable millimeter wave focal plane array of claim 27 wherein M is greater than 2 and N is greater than 2.

29. A method of fabricating a millimeter wave module for providing one pixel having a pixel resolution in a millimeter wave focal plane array, method comprising:
providing a horn antenna for receiving millimeter wave signals having a recess on a rear side of the horn antenna for aligning a detector;
mounting a detector substrate in the recess, the detector substrate configured to be aligned by the recess to the horn antenna and having a detector on the detector substrate for detecting the millimeter wave signals received by the horn antenna, the detector aligned by the detector substrate to receive the millimeter wave signals from the horn antenna; and
providing a video output adapter mounted on the rear side of the horn antenna and electrically connected to the detector for providing a connection from the detector.

30. The method of claim 29 wherein the detector comprises:
a signal probe coupled to the substrate for receiving the millimeter wave signals from the horn antenna;
a diode coupled to the substrate and electrically coupled to the signal probe; and
a video output coupled to the diode and to the video output adapter.

31. The method of claim 30 wherein the diode is a Sb-heterostructure diode.

32. The method of claim 29 wherein the horn antenna comprises a ridged waveguide transition.

33. The method of claim 29 wherein the horn antenna further comprises:
an essentially circular opening having a ridge; and
wherein the ridge is aligned with the ridged waveguide transition.

34. The method of claim 29 wherein the horn antenna further comprises:
an essentially rectangular opening having a ridge; and
wherein the ridge is aligned with the ridged waveguide transition.

35. The method of claim 29 wherein the video output adapter comprises:
a spring electrically coupled to the detector; and
a pin slidably mounted in the video output adapter and in contact with the spring, the pin being electrically conductive.

36. The method of claim 35 wherein the video output adapter is configured for the slidably mounted pin to contact a ball in a ball grid array.

37. The method of claim 35 wherein the video output adapter is configured for the slidably mounted pin to contact a cable connector.

* * * * *